United States Patent [19]

Bloom et al.

[11] 4,242,689
[45] Dec. 30, 1980

[54] ABLATIVE OPTICAL RECORDING MEDIUM
[75] Inventors: Allen Bloom, East Windsor; Robert A. Bartolini, Trenton, both of N.J.
[73] Assignee: RCA Corporation, New York, N.Y.
[21] Appl. No.: 834,271
[22] Filed: Sep. 19, 1977
[51] Int. Cl.$^3$ .............................. G01D 15/34
[52] U.S. Cl. .................................. 346/135.1
[58] Field of Search .......................... 346/135, 76 L
[56] References Cited
U.S. PATENT DOCUMENTS 4,023,185  5/1977  Bloom et al. ................ 346/135
4,069,487  1/1978  Kasai et al. ................ 346/76 L Primary Examiner—George H. Miller, Jr.
Attorney, Agent, or Firm—H. Christoffersen; Birgit E. Morris; Allen Bloom

[57] ABSTRACT

An ablative recording medium comprises a substrate coated with a light reflecting layer which in turn is coated with a light absorptive layer of di-indeno[1,2,3-cd:1',2',3'-lm]perylene. During recording, portions of the light absorptive layer are ablated by a modulated focussed light beam, thereby exposing portions of the reflecting layer. Video information is recorded as a reflective-antireflective pattern.

7 Claims, 5 Drawing Figures

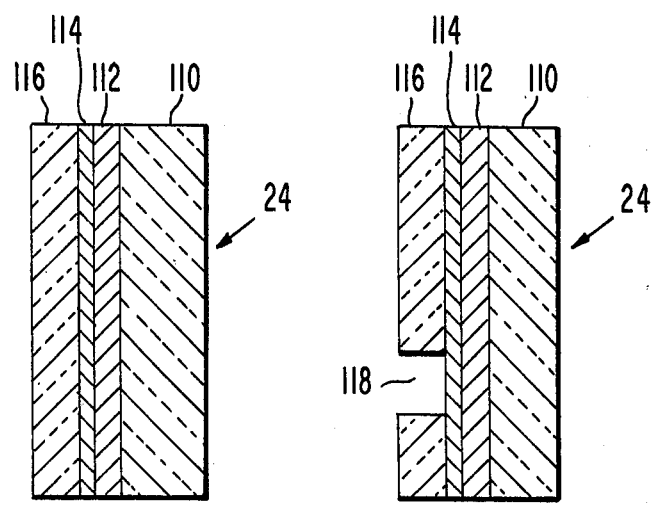
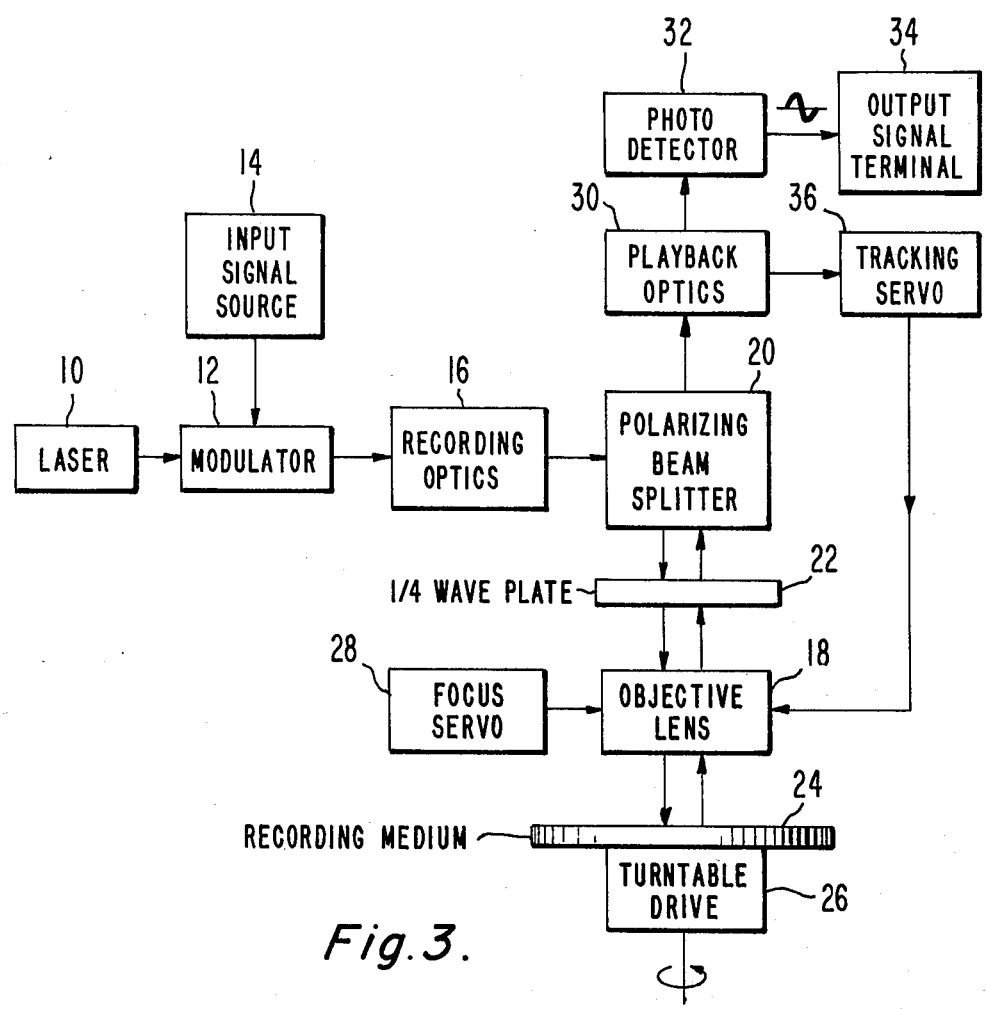
Fig.1.  Fig.2.
Fig.3.

ABLATIVE OPTICAL RECORDING MEDIUM

The Government has rights to this invention pursuant to Contract No. MDA904-76-C-0429 issued by the Department of the Army.

This invention relates to a novel optical recording medium. More particularly this invention relates to an optical recording medium for ablative recording.

BACKGROUND OF THE INVENTION

Spong, in a U.S. Pat. No. 4,097,895 entitled, "Information Record and Related Recording and Playback Apparatus and Methods", has described an ablative recording medium which comprises a light reflective material, such as aluminum, which is coated with a thin film of an optically absorbing organic material, such as fluorescein. A focussed intensity modulated light beam, such as a laser beam from an argon or helium-cadmium laser, when directed at the recording medium, vaporizes or ablates the light absorbing material, leaving a hole or pit and exposing the reflective material. The thickness of the light absorbing layer is chosen so that the structure has minimum reflectivity. After recording there will be maximum contrast between the minimum reflectivity of the light absorbing layer and the higher reflectivity of the exposed metal material. Further, when the light reflective material is itself a thin layer on a nonconductive substrate, since little energy is lost through reflection from the thin absorbing layer, and little energy is lost by transmission through the reflecting layer, the energy absorption of the light beam is concentrated into a very thin film and recording sensitivity is surprisingly high.

U.S. Pat. No. 4,023,185 discloses that 4-phenylazo-1-naphthylamine provides an excellent light absorptive layer which is absorptive at argon laser frequencies, and has improved toughness and abrasion resistance. This dye is applied by evaporation of Sudan Black B, which is thermally decomposed to form the naphthylamine layer.

The above organic dye layers are somewhat soft and fragile and thus the dyes are desirably protected from dust and other airborne contaminants. Copending U.S. application of Bloom et al, "Thick Protective Overcoat Layer for Optical Video Disc" (Ser. No. 828,815) discloses applying a thick protective overcoat, such as a silicone resin, over the light absorptive layer. The information pattern is recorded through the protective overcoat which is comparatively undisturbed after recording. Only a few materials suitable for overcoat layers have been found because of the solubility of the above dyes in many organic polymer precursors. It would be desirable to find different dyes having good absorption at argon laser wavelengths and having low solubility in organic materials.

SUMMARY OF THE INVENTION

We have found that di-indeno[1,2,3-cd:1',2',3'-1m]perylene can be readily evaporated onto a light reflecting layer to form an excellent ablative recording medium. This dye is quite insoluble in common organic solvents and can be overcoated with various materials which form protective coatings.

BRIEF DESCRIPTION OF THE DRAWINGS

FIG. 1 is a cross sectional view of an unablated recording medium of the invention.

FIG. 2 is a cross sectional view of a recording medium of the invention after ablation.

FIG. 3 is a schematic view of a system of recording and playback in which the present recording medium can be employed.

DETAILED DESCRIPTION OF THE INVENTION

Di-indeno[1,2,3-cd:1',2',3'-1m]perylene has the formula

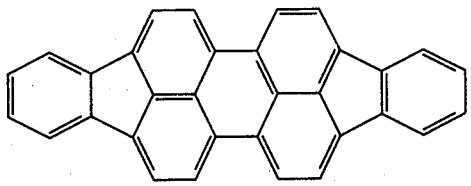

Figure 4:
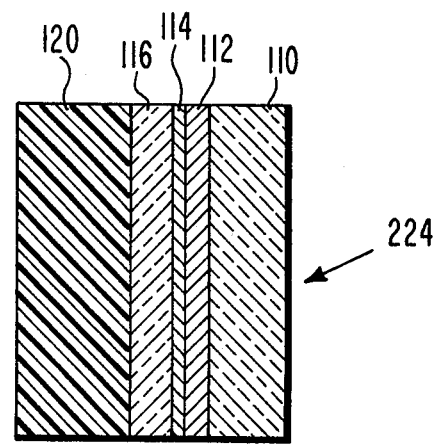
FIG. 4 is a cross-sectional view of an unablated recording medium of the invention which includes a protective overcoat.

This dye can be evaporated under vacuum directly onto light reflecting surfaces such as aluminum or gold to form stable, insoluble layers. The present recording medium absorbs at the 4880 angstrom wavelength emitted by an argon laser. The index of refraction is 1.89 and the absorption coefficient of the evaporated film, K, is 0.139. In accordance with the requirements described in the Spong application referred to above, a thickness of about 270 angstroms for 4880 angstrom wavelength recording is desirable to give a minimum reflection condition when evaporated onto a layer about 300 angstroms thick of aluminum which has been oxidized to a depth of 25–30 angstroms.

When the light reflecting layer is a thin layer on a substrate, the nature of the substrate is not critical but it must have an optically smooth, flat surface to which a subsequently applied light reflecting layer is adherent. A glass plate or disc is suitable. If the light reflecting material can be formed so that it is self-sustaining and optically smooth, a substrate may be omitted.

The light reflecting material should reflect the light used for recording. Suitable light reflecting materials include aluminum, gold, rhodium and the like. Preferably the reflecting material is aluminum coated with a thin layer of aluminum oxide ($Al_2O_3$) which forms a highly reflective, inert and stable reflecting material. This reflecting material and its preparation are more fully described in copending U.S. application of Bartolini et al, Ser. No. 668,504, filed Mar. 19, 1976.

The present organic dye layer can be applied by placing an evaporating boat containing the dye in a vacuum chamber. The boat is connected to a source of current. The substrate coated with an aluminum light reflecting layer is positioned above the boat. The vacuum chamber is evacuated to about $10^{-6}$ torr and about 4 amperes are applied to the boat to raise its temperature to about 250° C., at which temperature the dye begins to evaporate. Evaporation is continued until a layer of the desired thickness is obtained, at which time the current is shut off and the chamber vented. The invention will be further explained by reference to the drawings.

FIG. 1 shows the recording medium 24 prior to exposure to a recording light beam comprising a glass substrate 110, a light reflecting layer 112 which can be a layer of aluminum about 300 angstroms thick and oxidized to a depth of about 30 angstroms to form an oxide layer 114 and a light absorbing dye layer 116 of di-indeno[1,2,3-cd:1',2',3'-1m]perylene.

FIG. 2 shows a recording medium 24 of the invention after exposure to a recording light beam wherein the dye layer 116 has been ablated to leave a hole 118, exposing the reflecting layer 114. It will be understood that a recording medium after recording contains a plurality of holes 118 rather than the single one shown in FIG. 2.

The use of the present recording medium can be explained in greater detail by referring to FIG. 3. For recording, the light emitted by a laser 10 is fed to a modulator 12 which modulates the light in response to an input electrical signal source 14. The intensity modulated laser beam is enlarged by recording optics 16 to increase the diameter of the intensity modulated laser beam so that it will fill the desired aperture of an objective lens 18. The enlarged modulated laser beam is totally reflected by a polarizing beam splitter 20 and passes through a beam rotating ¼ wave plate 22 to the objective lens 18. The modulated recording beam then impinges upon a recording medium 24, as described in FIG. 1, and ablates, or evaporates, a portion of the light absorbing layer to expose a portion of the reflecting layer. The recording medium 24 is rotated by the turntable drive 26 at about 1800 rpm in a spiral track. A focus servo 28 maintains a constant distance between the objective lens 18 and the surface of the recording medium 24.

For readout, an unmodulated and less intense laser beam, that is one that will not cause ablation in the recording medium, follows the same path as the recording beam to the recording medium 24. The recorded reflection-antireflection pattern modulates the reflected light back through the objective lens 18 and the ¼ wave plate 22. The light, now rotated by 90° in polarization by each of the two passages through the quarter wave plate 22, passes through the polarizing beam splitter 20 and is directed by playback optics 30 to a photodetector 32. The photodetector 32 converts the reflected light beam to an electrical output signal at terminal 34 which corresponds to the input signal. A tracking servo 36 monitors the light through the playback optics 30 to ensure that the track in the recording medium 24 during playback is the same as that used for recording.

FIG. 4 shows a recording medium 224 prior to exposure to a recording light beam comprising a glass substrate 110, a light reflecting layer 112 which can be a layer of aluminum about 300 angstroms thick oxidized to a depth of about 30 angstroms to form an oxide layer 114. A light absorbing dye layer 116 of di-indeno[1,2,3-cd:1',2',3'-1m]perylene and a protective overcoat layer 120 complete the recording medium 224.

Figure 5:
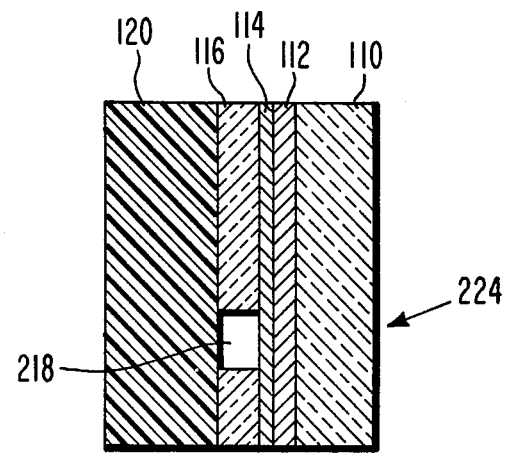
FIG. 5 is a cross-sectional view of a recording medium of the invention which includes a protective overcoat after ablation.

FIG. 5 shows the recording medium 224 of the invention after exposure to a recording light beam wherein the dye layer 116 has been ablated to leave a hole 218, exposing a portion of the reflective layer 114. It will be understood that a recording medium after recording contains a plurality of holes 218 rather than the single one shown in FIG. 5.

The invention will be further illustrated by the following Examples but the invention is not meant to be limited to the details described therein.

EXAMPLE 1

A glass disc 12 inches (30.5 cm) in diameter was coated with a layer of aluminum about 300 angstroms thick. The surface was oxidized to a depth of about 30 angstroms to stabilize the metal layer.

The coated disc was rotated in a vacuum chamber above an evaporating boat containing di-indeno[1,2,3-cd:1',2',3'-1m]perylene. A source of current was connected to the boat and the vacuum chamber was evacuated to about $10^{-6}$ torr. The boat was heated with the shutter closed by passing a current to the boat until the temperature reached about 250° C., when the shutter was opened. The dye began to evaporate at a rate of about 50 angstroms per minute. Evaporation was continued until the dye layer was about 270 angstroms thick.

A smooth, amorphous, clear and continuous absorptive layer was deposited onto the light reflecting layer.

The recording medium as prepared above was exposed to a recording signal of 50 nanosecond pulses of light having a wavelength of 4880 angstroms from an argon laser in an apparatus as in FIG. 3, varying the laser power. The contrast between the light reflecting and the light absorbing layers was noted and the signal-to-noise ratio (SNR) in decibels (dB) measured at varying laser power. The results are summarized in Table I below:

TABLE I

| Laser Power, mW | Contrast, % | SNR, dB |
|---|---|---|
| 500 | 33 | 44 |
| 400 | 33 | 45 |
| 300 | 33 | 45 |
| 200 | 33 | 41 |
| 100 | 30 | 35 |
| 50 | threshold | |

EXAMPLE 2

A recording medium was prepared as in Example 1 except that the reflecting layer was an evaporated gold layer about 800 angstroms thick and the dye layer was 175 angstroms thick. The results are summarized in Table II below:

TABLE II

| Laser Power, mW | Contrast, % | SNR, dB |
|---|---|---|
| 500 | 47 | 46 |
| 400 | 47 | 47 |
| 300 | 43 | 47 |
| 200 | 40 | 42 |
| 100 | 30 | 35 |
| 50 | threshold | |

EXAMPLE 3

A recording medium was prepared as in Example 1. A silicone rubber protective overcoat layer about 4 mils thick was applied according to the procedure in copending U.S. application of Bloom et al, "Thick Protective Overcoat Layer for Optical Video Disc" (Ser. No. 828,815).

A signal recording was made as in Example 1 having a signal-to-noise ratio of about 39 dB using an argon laser with output power of between 300–400 milliwatts.

CONTROL

A recording medium was prepared as in Example 1 except substituting as the light absorbing layer an evaporated layer of perylene dye, which has the formula

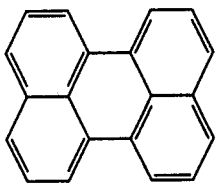

The resulting dye film was cloudy and thus unsuitable for the present application.

We claim:

1. In an ablative optical recording medium which comprises a light reflecting material coated with a light absorbing material, the improvement which comprises employing as the light absorbing layer a layer of di-indeno[1,2,3-cd:1',2',3'-1m]perylene.

2. A medium according to claim 1 wherein said reflecting material is aluminum.

3. A medium according to claim 1 wherein said reflecting material is gold.

4. A medium according to claim 1 wherein said light reflecting material is in the form of a thin layer on a substrate.

5. A medium according to claim 2 wherein said di-indeno[1,2,3-cd:1',2',3'-1m]perylene layer is about 270 angstroms thick.

6. A medium according to claim 3 wherein said di-indeno[1,2,3-cd:1',2',3'-1m]perylene layer is about 175 angstrom thick.

7. A medium according to claim 1 wherein a silicone resin protective overcoat layer is applied over the light absorbing layer.

* * * * *